United States Patent [19]
Garvey et al.

[11] 4,432,575
[45] Feb. 21, 1984

[54] LOCK STRIKER ANCHOR PLATE ASSEMBLY

[75] Inventors: Louis P. Garvey, West Bloomfield; Robert A. Maye, Warren, both of Mich.

[73] Assignee: General Motors Corporation, Detroit, Mich.

[21] Appl. No.: 346,482

[22] Filed: Feb. 8, 1982

[51] Int. Cl.[3] .......................... E05B 15/02; F16B 37/04; F16B 39/28

[52] U.S. Cl. .......................... 292/341.18; 292/341.19; 411/103

[58] Field of Search .......................... 292/341.18, 341.19, 292/DIG. 60, DIG. 41, 216; 411/103–106, 92, 93, 98, 84, 85

[56] References Cited

U.S. PATENT DOCUMENTS

| | | | |
|---|---|---|---|
| 2,299,158 | 10/1942 | Luce | 411/84 |
| 2,451,991 | 10/1948 | Swanstrom | 411/103 |
| 2,622,911 | 12/1952 | Cooper | 292/341.18 |
| 2,669,477 | 2/1954 | Jewell | 292/341.18 |
| 2,681,245 | 6/1954 | Ackermans | 292/341.19 |
| 2,790,667 | 4/1957 | Schoepe | 292/341.18 |
| 3,164,191 | 1/1965 | Grimm et al. | 411/85 |
| 3,446,261 | 5/1969 | Dey | 411/85 |
| 4,186,787 | 2/1980 | Husain | 411/183 |
| 4,219,064 | 8/1980 | Lozano | 411/103 |

FOREIGN PATENT DOCUMENTS

| | | | |
|---|---|---|---|
| 1982 | 12/1889 | Sweden | 292/341.19 |

*Primary Examiner*—Gary L. Smith
*Assistant Examiner*—R. Illich
*Attorney, Agent, or Firm*—Patrick M. Griffin

[57] ABSTRACT

An adjustable lock striker bolt assembly includes an anchor plate which is manually snap assembled to a retention bracket by an operator without tools and with limited access to the inside of the lock pillar. The retention bracket includes a pair of spaced laterally extending retention flanges, each including a retention slot. The anchor plate includes a thickened central body portion and a pair of legs extending oppositely therefrom. To assemble the anchor plate to the bracket, one leg of the anchor plate is inserted through the slot of one flange until the central body portion contains the one flange. This locates the edge portion of the other leg in engagement with the other flange. Manual pressure of the anchor plate snaps the edge portion of the other leg into the slot of the other flange.

1 Claim, 5 Drawing Figures

LOCK STRIKER ANCHOR PLATE ASSEMBLY

BACKGROUND OF THE INVENTION

Vehicles generally include a lock pillar mounted striker bolt engageable by a door mounted latch bolt to maintain the door in closed position. Since the striker bolt must be adjustable relative to the lock pillar to accommodate production tolerances, the bolt anchor plate on the inside wall of the lock pillar must be adjustably mounted. Access to such wall for mounting of the anchor plate is limited during vehicle assembly. Mounting of the anchor plate when access is complete prior to body assembly is not practical as paint may later clog the threaded apertures during painting operations. Therefore, it is desirable that such mounting be simple and not require tool access.

Adjustable lock striker anchor plates are known in the prior art. Ackermans U.S. Pat. No. 2,681,245 shows a floating reinforcement plate attached to the vehicle lock pillar by peened rivets and spring tensioners. This requires several fasteners, which must be assembled with full access to the inside wall of the lock pillar.

Another adjustable anchor plate includes a retainer bracket welded to the inside wall of the lock pillar. A series of bendable tabs on the retainer bracket are bent over the anchor plate to adjustably retain the plate. The mounting of the anchor plate into the retention bracket requires accessibility for a tool such as a hammer in order to bend over the tabs.

SUMMARY OF THE INVENTION

The subject invention provides an adjustable lock striker bolt anchor plate which is snap fitted into a retention bracket. No tools are required and there need be only limited accessibility to the retention bracket.

The retention bracket includes an apertured planar mounting portion welded to the inside wall of the lock pillar and having a pair of spaced integral arcuate retention flanges, each of which includes a retention slot. The portion of each retention flange remaining after the retention slots are formed includes a pair of spaced struts and a bridging portion. The struts of at least one flange are laterally flexible relative to the mounting portion.

An anchor plate has a central body portion with a threaded aperture therethrough and a pair of legs which extend oppositely thereof. The edge portions of the legs are spaced apart a distance greater than the separation of the retention flanges. The legs are sized to be slidably receivable through the slots in the retention flanges while the central body portion is sized larger than either slot and will not pass therethrough. The anchor plate is assembled to the retention bracket by sliding one leg through the retention slot in the other flange until the central body portion engages such other flange and the other leg engages the bridging portion of the one flexible flange. Pressure is then applied to the anchor plate to flex the struts of the one retention flange and snap the edge portion of the other leg of the anchor plate into the slot of the one retention flange. Thus, the anchor plate is slidably retained within the slots of the retention flanges. The striker bolt can then be inserted through aligned apertures of the lock pillar and retention bracket and threaded into the anchor plate.

It is therefore an object of the invention to provide an adjustable lock striker bolt anchor plate assembly wherein an anchor plate is assembled to a retention bracket without requiring any tools or full accessibility to the lock pillar. It is another object of the invention to provide such an assembly wherein the anchor plate is manually snap fitted to the retention bracket.

These and other objects of the invention will appear from the following written description and drawings in which.

DESCRIPTION OF THE PREFERRED EMBODIMENT

Figure 1:
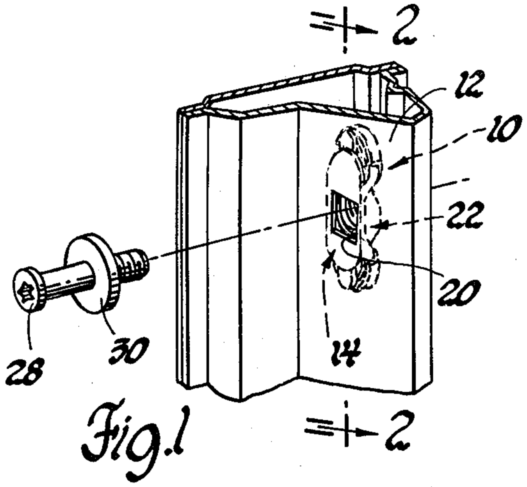
FIG. 1 shows a portion of a vehicle lock pillar with the retention bracket and anchor plate of the assembly mounted to the inside wall thereof and the striker bolt removed.
Figure 2:
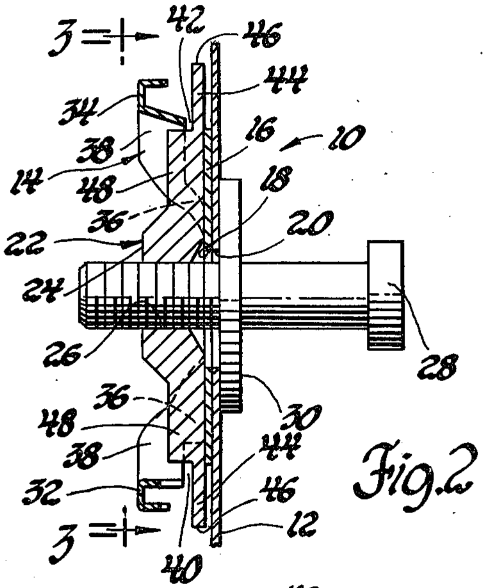
FIG. 2 is an enlarged sectional view along the line 2—2 of FIG. 1 with the striker bolt assembled.

Referring first to FIGS. 1 and 2, the adjustable lock striker bolt anchor plate assembly 10 of the invention is shown mounted to the inside wall of a vehicle door lock pillar 12. The assembly 10 includes a retention bracket 14 having a planar mounting portion 16 which is welded to the inside wall of lock pillar 12. A central aperture 18 through mounting portion 16 is located generally concentrically with an aperture 20 through pillar 12. An anchor plate 22 of the assembly includes a central body portion 24 having a counterbored central threaded aperture 26 therein. Anchor plate 22 is slidably retained within retention bracket 14 as described below. A threaded and shouldered striker bolt 28 passes through apertures 18 and 20 and is threaded into aperture 26 to clamp the anchor plate 22 against planar mounting portion 16 and to clamp annular shoulder 30 of striker bolt 28 against the outer wall of lock pillar 12.

Retention bracket 14 includes a pair of laterally spaced retention flanges 32 and 34 which are stamped integrally with retention bracket 14 substantially perpendicular thereto and having a generally arcuate shape. Both flanges 32 and 34 include two generally parallel, spaced apart struts 36 connected across the top by a bridging portion 38. Struts 36 and bridging portion 38 comprise that portion of each flange 32 and 34 remaining after respective retention slots 40 and 42 are formed therein during the stamping process. Slot 42 is generally rectangular in cross-section and the struts 36 surrounding it are formed so as to resiliently bend when pressure is applied to bridging portion 38 to thereby allow bridging portion 38 to flex laterally of mounting portion 16. Slot 40 is generally T-shaped, the purpose for which is next described.

Anchor plate 22 includes a pair of legs 44 extending laterally of central body portion 24, each terminating in an edge portion 46. A rib 48 strengthens the juncture of each leg 44 with the central body portion 24. In addition, body portion 24, which is substantially symmetrical as shown, has, at the dotted line cross-sections designated 50 and 52 in FIG. 5, a thickness greater than the depth of slot 42 and will not pass therethrough. Each leg 44, on the other hand, is thin enough between each edge portion 46 and adjacent rib 48 to pass through both slots 40 and 42. In addition, the lateral spacing between a cross-section 50 or 52 and a remote edge portion 46, the edge portion that is farther away therefrom, is slightly greater than the lateral spacing between one flange 32 and the bridging portion 38 of the other flange 34. This spacing relation, along with the flexibility of the struts 36 of flange 34, allows the snap assembly of anchor plate 22 within retention bracket 14, next described.

Figure 4:
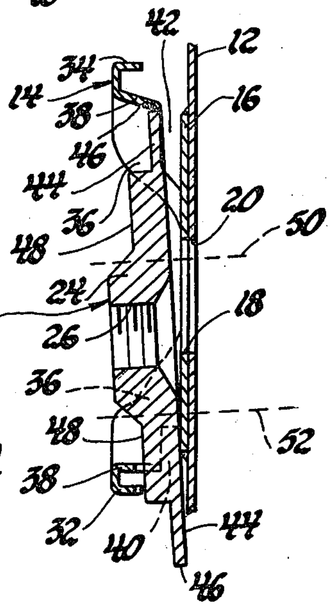
FIG. 4 is a view similar to FIG. 2 showing the anchor plate partially assembled to the retention bracket.
Figure 5:
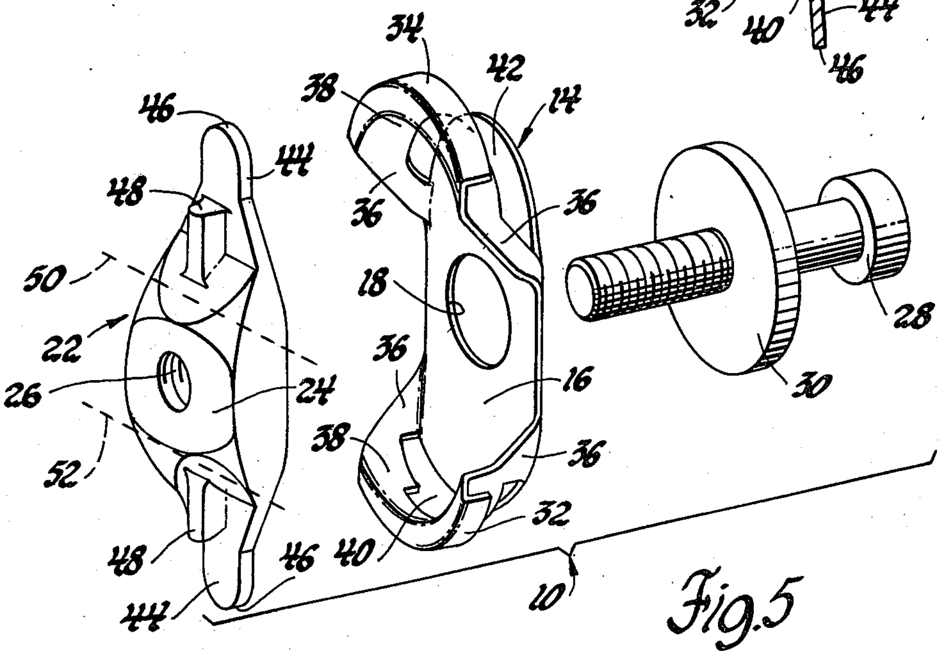
FIG. 5 is an exploded perspective view.

Referring now to FIGS. 4 and 5, anchor plate 22 is assembled into retention bracket 14 by sliding one leg 44 and its respective rib 48 through the T-shaped slot 40 until body portion 24 contacts the bridging portion 38 of flange 32 at cross-section 52. Because of the spacing relation between cross-section 52 and the remote edge portion 46 described above, this locates such edge portion 46 of the other leg 44 in engagement with the bridging portion 38 of flange 34, as seen in FIG. 4, close to slot 42. When manual pressure is thereafter applied to anchor plate 22, such edge portion 46 of the other leg 44 snaps past bridging portion 38 and into slot 42 as struts 36 flex laterally of mounting portion 16.

Thus, each leg 44 is retained slidably within a respective retention slot 40 or 42.

Figure 3:
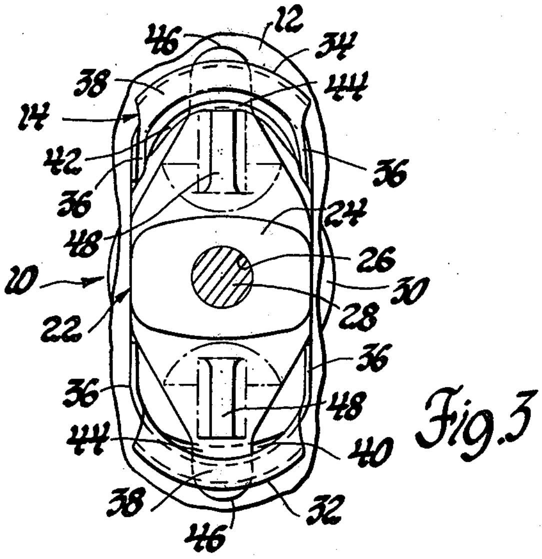
FIG. 3 is a view of the assembly in the direction of arrows 3—3 of FIG. 2.

This assembly of anchor plate 22 into bracket 14 can be easily done by an operator reaching through a relatively small hole in the body to obtain access to the bracket 14. No tools are necessary for assembly. After assembly, the striker bolt 28 is inserted through apertures 18 and 20 and threaded into aperture 26. The bridging porions 38 of retention flange 32 and 34 locate anchor plate 22 such that aperture 26 opens to apertures 18 and 20. This may be seen best in FIGS. 2 and 3. Rib 48 will engage bridging portion 38 above the shallower slot 42 to limit anchor plate 22 in the up direction, while the engagement of cross-section 52 with the bridging portion 38 of the opposite flange 32 limits anchor plate 22 in the down direction. Up and down would be reversed, of course, if retention bracket 14 were reversed. When the striker bolt 28 is threaded into aperture 26, legs 44 will contact the struts 36 to prevent anchor plate 22 from turning. Striker bolt 28 is partially tightened, moved to final position, and then finally tightened.

Since anchor plate 22 is symmetrical about its center, it will always be properly assembled to bracket 14 regardless of which leg 44 is first inserted through the T-shaped slot 40.

Variations of the embodiment disclosed are possible without departing from the invention.

Thus, this invention provides an adjustable lock striker bolt assembly in which an anchor plate may be assembled to a retention bracket by an operator working with limited access and without any tools.

The embodiments of the invention in which an exclusive property or privilege is claimed are defined as follows:

1. An adjustable lock striker anchor assembly comprising, a retention bracket having a mounting portion, a pair of opposed laterally spaced retention flanges extending substantially normally to the mounting portion of the retention bracket and symmetrical with respect thereto, each retention flange having a slot therethrough defined by the planar mounting portion, a pair of side struts and an upper bridging portion, the slot of one retention flange being sized larger than the slot of the other retention flange, the struts of at least one flange being flexible to permit the bridging portion of the flange to flex laterally of the mounting portion, an anchor plate having a central body portion and a pair of legs extending laterally thereof, each leg terminating in an edge portion spaced laterally of the edge portion of the other leg by a distance greater than the lateral separation of the bridging portions of the retention flanges, each leg being slidably receivable through the slot of a retention flange to retain the anchor plate within the retention bracket, the central body portion further including a pair of sections, each being sized larger than the slot of the said one retention flange, and each spaced from a remote leg edge portion by an amount slightly greater than the lateral spacing between said one flange and the said other flange, the central body portion further including a pair of ribs intermediate each said leg edge portion and said section and sized smaller than the slot of said one retention flange but larger than the slot of said other retention flange, the anchor plate being assembled within the retention bracket by sliding either leg and rib through the slot of the said one retention flange in one direction until a central body portion section engages the said one retention flange and the edge portion of the other leg engages the bridging portion of the other retention flange, the edge portion being resiliently forced past the bridging portion of the other retention flange and into the slot thereof as the struts thereof flex laterally of the mounting portion of the retention bracket, the anchor plate being more closely slidably confined within the retention bracket in the other direction by the engagement of a rib with the said other retention flange.

* * * * *